US009352365B2

(12) United States Patent
McCool

(10) Patent No.: US 9,352,365 B2
(45) Date of Patent: May 31, 2016

(54) REUSABLE TOOL ASSEMBLY FOR PURGING FLUID FROM A FLUID FLOW PIPE SYSTEM OR A PORTION THEREOF

(71) Applicant: William B. McCool, Burke, VA (US)

(72) Inventor: William B. McCool, Burke, VA (US)

( * ) Notice: Subject to any disclaimer, the term of this patent is extended or adjusted under 35 U.S.C. 154(b) by 0 days.

(21) Appl. No.: 14/637,564

(22) Filed: Mar. 4, 2015

(65) Prior Publication Data

US 2015/0176768 A1 Jun. 25, 2015

Related U.S. Application Data

(63) Continuation of application No. 14/105,227, filed on Dec. 13, 2013, now Pat. No. 9,085,016.

(51) Int. Cl.

| | |
|---|---|
| ***F16K 3/36*** | (2006.01) |
| ***B08B 9/00*** | (2006.01) |
| ***B67D 7/72*** | (2010.01) |
| ***B08B 9/032*** | (2006.01) |
| *E03C 1/304* | (2006.01) |
| *F17D 3/14* | (2006.01) |

(52) U.S. Cl.

CPC ................ *B08B 9/00* (2013.01); *B08B 9/0328* (2013.01); *B67D 7/72* (2013.01); *E03C 1/304* (2013.01); *F17D 3/14* (2013.01); *Y10T 137/0419* (2015.04); *Y10T 137/0424* (2015.04); *Y10T 137/4259* (2015.04); *Y10T 137/598* (2015.04)

(58) Field of Classification Search

CPC .................. Y10T 137/0419; Y10T 137/3127; Y10T 137/3115; Y10T 137/4259; Y10T 137/4238; Y10T 137/0424; Y10T 137/598; E03C 1/30; E03C 1/308; E03C 1/304; B08B 9/093; B08B 9/00; B08B 9/0328; B67D 7/72; F17D 3/14

USPC ............. 15/300.1, 316.1, 405, 406; 122/379; 285/39; 251/149.6

See application file for complete search history.

(56) References Cited

U.S. PATENT DOCUMENTS

| | | | |
|---|---|---|---|
| 3,156,584 | A | 11/1964 | Yurdin |
| 4,063,317 | A | 12/1977 | Santore |
| 5,085,244 | A | 2/1992 | Funk |
| 5,530,988 | A | 7/1996 | McQuillan |
| 5,548,993 | A | 8/1996 | Alexandre |
| 5,582,204 | A | 12/1996 | Hiranuma |

(Continued)

FOREIGN PATENT DOCUMENTS

RU 96908 U1 * 8/2010

*Primary Examiner* — Jessica Cahill

(74) *Attorney, Agent, or Firm* — Pillsbury Winthrop Shaw Pittman, LLP

(57) ABSTRACT

A reusable tool assembly for purging fluid from a fluid flow pipe system or a portion thereof is presented. The tool assembly includes an input portion configured to accommodate a positively-pressurized flow of air/gas, a flow control portion configured to regulate an amount of pressurized air/gas flow, and a pressure measurement gauge device configured to measure and indicate the amount of pressurized air/gas flow, as regulated by the flow control portion. The tool further includes and an output portion configured to introduce the regulated amount of pressurized air/gas flow into the fluid flow pipe system, the output portion containing a pressure-fitted slip coupling device that temporarily, releasably, and sealably engages an exterior, unthreaded surface of an open pipe portion providing access into the fluid flow pipe system and enabling the air/gas flow to purge fluid from the fluid flow pipe system.

6 Claims, 4 Drawing Sheets

(56) References Cited

U.S. PATENT DOCUMENTS

| | | | | |
|---|---|---|---|---|
| 5,803,101 | A | 9/1998 | Gallo | |
| 5,957,509 | A | 9/1999 | Komolrochanaporn | |
| 6,237,620 | B1 | 5/2001 | Ferguson | |
| 6,708,717 | B1 | 3/2004 | Coogle | |
| 7,195,287 | B2 | 3/2007 | Wai | |
| 7,624,756 | B1 | 12/2009 | Coogle | |
| 7,862,089 | B2 | 1/2011 | Crompton | |
| 8,893,350 | B2 * | 11/2014 | Mai | B08B 9/08 153/300.1 |
| 2005/0274415 | A1 | 12/2005 | Shores | |
| 2007/0266485 | A1 | 11/2007 | Tackett | |
| 2008/0238088 | A1 * | 10/2008 | Webb | B25B 27/10 385/39 |
| 2010/0282336 | A1 * | 11/2010 | Pearl, II | B08B 3/02 137/240 |
| 2011/0140417 | A1 | 6/2011 | Kluss | |
| 2012/0024386 | A1 | 2/2012 | O'Leary | |

* cited by examiner

REUSABLE TOOL ASSEMBLY FOR PURGING FLUID FROM A FLUID FLOW PIPE SYSTEM OR A PORTION THEREOF

CROSS REFERENCE TO RELATED APPLICATION

This application is a continuation application of co-pending U.S. application Ser. No. 14/105,227, filed Dec. 13, 2013, the entire contents of which is incorporated herein by reference.

This disclosure relates generally to the field of fluid flow pipe systems, and in particular, to a reusable tool assembly to purge or evacuate fluids from such systems or segments thereof.

BACKGROUND

Fluid flow pipe systems provide the infrastructure necessary to accommodate the flow of fluids, such as, liquids, gases, or slurries, etc, in residential and commercial applications. For example, such systems are commonly found in residential homes, office buildings, factories, car washes, swimming pools, irrigation installations, septic installations, etc.

Regardless of the applications, most fluid flow pipe systems share certain common elements, such as:

(a) pipes: pipes are hollow cylindrical members configured to conduct or transfer fluids. Pipes may comprise metal materials (e.g., carbon steel, stainless steel, copper, copper alloys, copper-nickel, etc.) or plastic materials (e.g., PVC, CPVC, UPVC, FRP, FRE PEX, etc.);

(b) pipe fittings: pipe fittings are attachments that are placed or affixed to the end pipe ends to provide versatility in changing the direction of fluid flow, distribution, increase or decrease flow capacity and interconnections. Pipe fittings may comprise a variety of configurations (e.g., elbows, bends, returns, tees, crosses, reducers, end caps, plugs, nipples, unions, couplings, bosses, etc.);

(c) valves: valves are mechanical devices configured to control the flow and pressure within the pipe system (e.g., gates, globes, plugs, balls, butterflies, checks, diaphragms, pinches, pressure reliefs, control valves, etc.;

(d) fixtures: fixtures are elements or amenities disposed at the end of pipe runs (e.g., faucets, toilets, showers, bidets, spigots, sprinklers, icemakers, etc.); and (e) pipe system service equipment: such equipment includes, but not limited to, water heaters, filtration units, desalinization units, water softeners, back-flow preventers, sump-pump units, etc.

For a variety of reasons, including but not limited to, environmental conditions, rust/corrosion, pressure variations, component fatigue/failure, substandard installation practices, etc., it is not uncommon for elements of fluid flow pipe systems to deteriorate or become defective, thereby requiring repair or replacement servicing. Repair/replacement servicing often requires that the fluid in the locally-affected area or defective equipment, or sometimes in the entire pipe system infrastructure, be sufficiently evacuated prior to the repair or replacement, resulting in time-consuming delays, inefficiencies, and customer inconvenience.

DETAILED DESCRIPTION

Figure 1A:
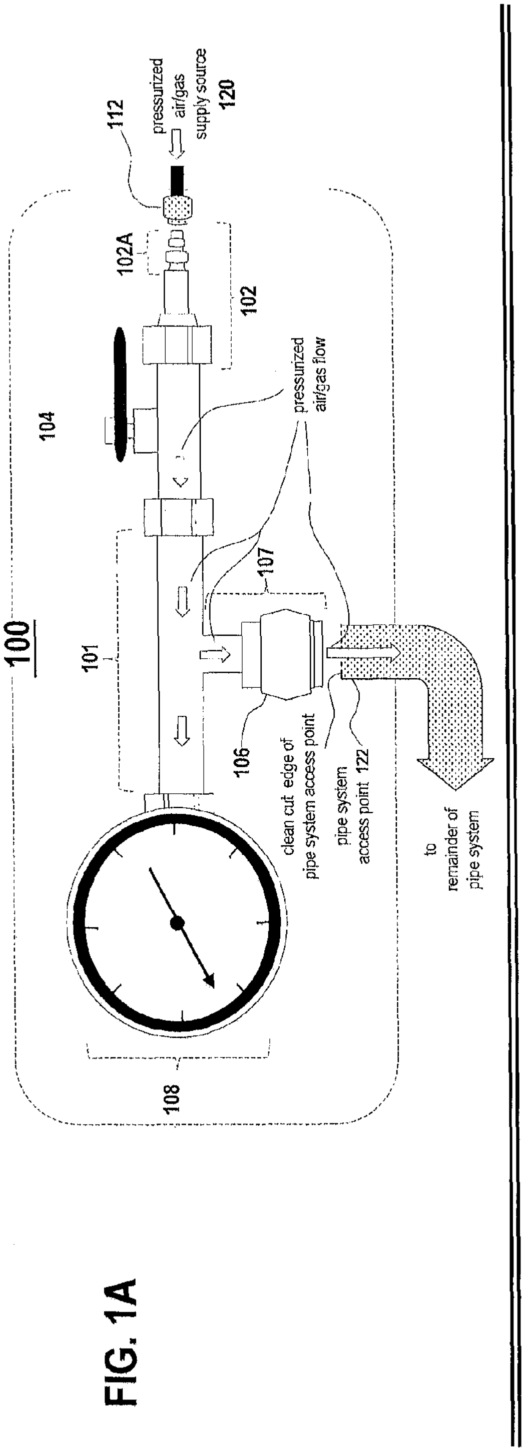
FIG. 1A depicts a tool assembly for purging fluid from a fluid flow pipe system, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various aspects and embodiments of the instant disclosure, a reusable tool assembly for purging fluid from a fluid flow pipe system or a segment thereof is presented. The reusable tool comprises an input portion configured to accommodate a positively-pressurized flow of air/gas, a flow control portion configured to regulate an amount of pressurized air/gas flow, a pressure measurement device configured to measure and indicate the amount of pressurized air/gas flow, as regulated by the flow control portion, and an output portion configured to introduce the regulated amount of pressurized air/gas flow into the fluid flow pipe system to purge fluid therefrom, the output portion including a pressure-fitted slip coupling device that temporarily, releasably, and sealably engages an outer, unthreaded surface of an open pipe portion providing access into the fluid flow pipe system.

Further, in accordance with various aspects and embodiments, the pressure-fitted slip coupling device of the output portion of the reusable tool assembly is configured with a hollow fastening ring having a plurality of angled teeth to engagingly grip the outer, unthreaded surface of the open pipe portion to provide stable attachment and fluid-tight seal of the tool assembly onto the open pipe portion to direct the pressurized air/gas flow into the open pipe portion and through fluid flow pipe system to purge fluid therefrom, and a flanged collet that, upon urging, biases the hollow fastening ring to release its grip on the open pipe portion and enable detachment of the tool assembly from the open pipe portion.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

As discussed above, repair/replacement servicing of pipe system elements often requires that the fluid in the locally-affected area or defective equipment (or entire pipe system infrastructure) be sufficiently evacuated prior to repair/replacement. One reason for the need to evacuate fluids prior to repair/replacement is that some pipe system service equipment also function as fluid-retaining vessels, such as, water heaters, filtration units, desalinization units, water softeners, etc. Such fluid-retaining vessels have to be drained and emptied of fluid prior to being physically removed and replaced. For example, a 50 gal. water heater weighs approximately 150 lbs. empty and approximately 550 lbs, when full. So, to remove a defective water heater, its drain cock valve is first opened to allow the water retained by the water heater to drain in an effort to lighten the load of the water heater. Such draining may be very time consuming as, generally, defective and/or older water heaters contain sediment and deposits that impede the flow of water egressing through the drain cock valve.

Another reason for the need to evacuate fluids prior to repair/replacement is that fluid flow, or remnants thereof, such as droplets, pooling, drips, residual moisture/dampness, etc., generally retard the effective joining of pipes and pipe fittings. For example, if an interposed pipe system element, such as, for example, a valve, becomes defective it must first be removed from the two respectively adjoined pipe sections and then a replacement valve is installed in its place. However, the joining of the replacement valve to the respective pipe sections requires that the pipe sections be substantially free from fluids, droplets, drips, residual dampness, etc., as moisture compromises the integrity of the connection bond regardless of whether the bonding agent comprises solder, glue, cement, or chemical welds. While various measures exist to ensure that pipe sections be substantially free of moisture, such measures are typically time consuming, if not inefficient.

To this end, FIG. 1 illustrates a high level diagram of reusable tool assembly 100 configured to efficiently and effectively evacuate or purge fluid from a fluid flow pipe system or sections thereof, in accordance with various aspects and principles of the present disclosure. As shown, tool assembly 100 includes body member portion 101, input portion 102, flow control portion 104, output portion 107 equipped with pressure-fitted slip coupling device 106, and pressure measurement gauge device 108. While, for ease of understanding, the following description may represent elements 101, 102, 104, 106, 107, and 108 of tool assembly 100 as being discrete components that are fastened, connected, or otherwise secured together, it will be appreciated that elements 101, 102, 104, 106, 107, and 108 or combinations thereof, may comprise a unitary integrally-formed structure or combinations of integrally-formed structures without departing from the spirit and scope of exemplary embodiments of this disclosure.

As illustrated in FIG. 1, body member portion 101 of tool assembly 100 comprises a multiport connection structure having a T-shaped configuration. The T-shape should not be interpreted as being limiting in any way, as other shapes and configurations accommodating three or more port connections will suffice, in accordance with other embodiments. Body member portion 101 also includes an interior channel (or channels) bored therethrough to communicate the flow of positively-pressurized air/gas throughout the body member and port connections.

Flow control portion 104 is coupled to one of the port connections of body member portion 101 and is configured to regulate the amount of pressurized air/gas flow that is introduced into tool assembly 100, including the body member and port connections, and ultimately directed into a pipe access portion 122 of a fluid flow pipe system (or section thereof), as described below. In the depicted embodiment, flow control portion 104 comprises a manual flow control valve with handle, but other flow control mechanisms, including electro-mechanical flow controllers, may be used, in accordance with other embodiments.

Coupled to flow control portion 104 is input portion 102, which is configured with connector 102A to couple tool assembly 100 to a positively-pressurized air/gas source 120 (e.g., compressed air/gas source) and accommodate the ingress of pressurized air/gas into flow control portion 104. In the depicted embodiment of FIG. 1A, connector 102A comprises an air connector nozzle that matingly engages a standard quick-connect air chuck coupler 112 commonly found in air compressor hoses. Along similar lines, positively-pressurized air/gas source 120 may comprise a portable air compressor (see, e.g., FIGS. 2-4). It will be appreciated that other connector configurations and compatible air/gas sources and hose couplers may be used, in accordance with other embodiments.

Coupled to another of the port connections of body member portion 101 is pressure measurement gauge device 108 configured to measure and indicate the amount of pressurized air/gas flow that is regulated by flow control portion 104 and introduced into tool assembly 100, including the body member and port connections (and ultimately into pipe access portion 122 of the fluid flow pipe system). With regard to most fluid flow pipe systems or sections thereof, positively-pressurized air/gas flows of 25-40 psi is sufficient to ensure efficient and effective evacuation or purging of fluids. In the depicted embodiment, pressure measurement gauge device 108 comprises a standard rotary dial air pressure gauge, but other pressure measurement devices, such as, electronic pressure gauges and the like may be used, in accordance with other embodiments.

Output portion 107 of tool assembly 100 comprises another port connection of body member portion 101 and is configured to introduce the regulated amount of pressurized air/gas flow into pipe access portion 122 of the fluid flow pipe system or section thereof. Output portion 107 includes a pressure-fitted slip coupling device 106 that temporarily, releasably, and sealably engages and connects to pipe access portion 122 of the fluid flow pipe system. In so doing, pressure-fitted slip coupling device 106 includes an interior channel to facilitate pressurized air/gas flow and is so dimensioned as to accommodate diameter $d_3$ of pipe access portion 122.

Figure 1D:
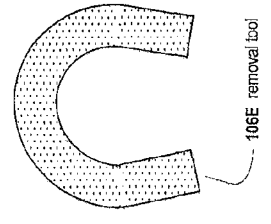
FIG. 1D depicts a disengagement removal tool for a pressure-fitted slip coupling device, in accordance with various aspects and principles of the present disclosure.

In some embodiments, output portion 107 may include an exterior threaded male portion with the interior channel bored therethrough. As depicted in FIG. 1B, the interior channel is configured with diameter $d_1$ that sufficiently accommodates the pressurized air/gas flow while the exterior threaded male portion is configured with diameter $d_1$. The threaded male portion of output portion 107 is configured to mate with a tapped, internally threaded portion 106A of a surface of a first (or top) end of slip coupling device 106, as depicted in FIGS. 1B, 1C.

To cooperate with the threaded male portion of output portion 107, the internally tapped threaded portion 106A of the first (or top) end of pressure-fitted slip coupling device 106 is configured with a corresponding diameter $d_1$ As depicted in FIG. 1B, the diameter of internally tapped threaded portion 106A comprises a fractional portion of the overall surface diameter $d_2$ of the first (or top) end of slip coupling device 106 to ensure stable attachment while, at the same time, diameter $d_1$, is sized to sufficiently accommodate the pressurized air/gas flow guided through diameter $d_1$ of the interior channel of output portion 107.

Figure 1C:
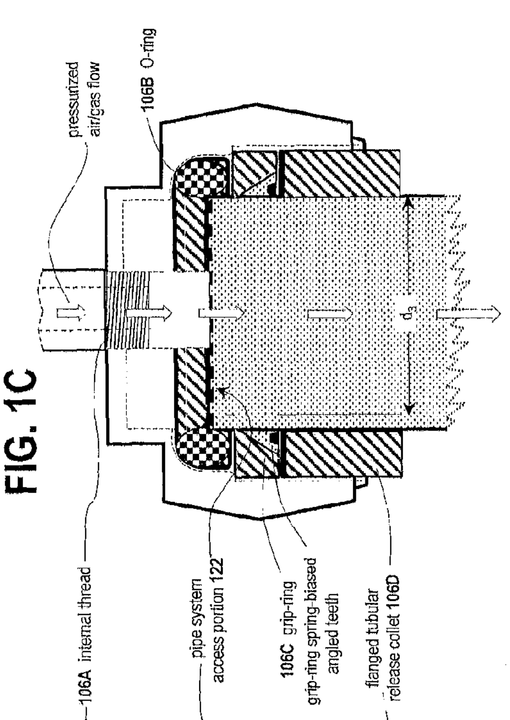
FIG. 1C depicts a cross-sectional view of a pressure-fitted slip coupling device, in accordance with various aspects and principles of the present disclosure.
Figure 1B:
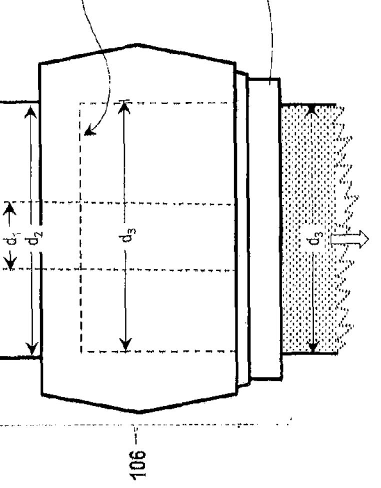
FIG. 1B depicts a pressure-fitted slip coupling device, in accordance with various aspects and principles of the present disclosure.

The second (or bottom) end of pressure-fitted slip coupling device 106 includes an opening that is configured to releasably and sealably engage pipe access portion 122 having diameter $d_3$, as depicted in FIGS. 1B, 1C. As such, the opening of the second (or bottom) end of slip coupling device 106 is sized with a corresponding diameter $d_3$.

In view of the fact that fluid flow pipe systems may incorporate pipes having different diameters $d_3$ (e.g., ¼ in., ⅜ in., ½ in., ¾ in., 1 in., 1½ in., etc.), tool assembly 100 has been designed with the flexibility to accommodate disparate pipe sizes. That is, in some embodiments, different slip coupling devices 106 having different second (or bottom) end diameters $d_3$ that cooperate with variously-sized pipe access portions 122, may each be configured to have their internally-threaded portion 106A sized to a common diameter $d_1$. This enables the different slip coupling devices 106 having the same internally-threaded portion 106A diameter $d_1$ but different second (or bottom) end diameters $d_3$ to be interchangeably screwed onto output portion 107 of tool assembly 100. The ability to swap out different slip coupling devices 106 with different diameters $d_3$ from tool assembly 100 to accommodate pipe access portions 122 having different diameters $d_3$, increases tool assembly's 100 versatility and flexibility.

In other embodiments, output portion 107 and slip coupling device 106 may be connected together via a releasable coupling device or may be integrally-formed as a, unitary structure to accommodate pipe access portions 122 of predetermined diameters $d_3$.

With regard to pressure-fitted slip coupling device 106, FIGS. 1B, 1C highlight certain features of slip coupling device 106 in greater detail. In particular, the second (or bottom) end of slip coupling device 106 internally incorporates O-ring 106B to ensure a fluid-tight seal upon engagement of pipe access portion 122. By fluid-tight seal, it is meant that the connection between the second (or bottom) end of slip coupling device 106 and pipe access portion 122 is sufficiently secure so as to prevent the escape of liquid and/or gas at the connective juncture.

Slip coupling device 106 also internally incorporates grip ring 106C having a plurality of spring-biased angled teeth that apply force to engagingly grip the exterior surface of pipe access portion 122 to ensure stable attachment of tool assembly 100 onto pipe access portion 122.

Slip coupling device 106 further includes a flanged tubular release collet 106D, which upon application of an urging force, such as that applied by removal tool 106E depicted in FIG. 1D, communicates the urging force onto the spring-biased angled teeth of grip ring 106C to thereby release the teeth's engaging grip on the exterior surface of pipe access portion 122 and enable detachment of tool assembly 100 from pipe access portion 122.

As described above, pressure-fitted slip coupling device 106 of tool assembly 100 ensures stable attachment of tool assembly 100 onto pipe access portion 122 to facilitate the regulated flow of pressurized air/gas into the fluid flow pipe system or any section thereof. It will be appreciated that pipe access portion 122 may be any pipe or pipe section that is cut to provide an open access to a fluid flow pipe system or section thereof. As such, pipe access portion 122 comprises a pipe or pipe section of fluid flow pipe system or section thereof that contains an open end with an unthreaded exterior surface and relatively clean cut, flush edge.

It will also be appreciated that the configuration of reusable tool assembly 100 has been intentionally designed to be a versatile, compact, unitary, portable structure that is easy to carry, install, operate, and remove. As noted above, reusable tool assembly 100 has been designed with the versatility to operate on different pipe access portions 122 having different diameters $d_3$. Equally notable, in some embodiments, reusable tool assembly 100 is configured to have a total length less than 10 in., preferably 5-6 in., as measured from the outer edge of pressure measurement gauge device 108 to the outer edge of air connector nozzle 102A. Such compact dimensions not only allows tool assembly 100 to be hand-carried (and, in most instances, pocket-carriable), but also enables installation, operation, and removal of tool assembly 100 in tight, constrained, work spaces that is often prevalent in the repair/replacement servicing of fluid flow pipe system elements.

By way of general instruction, tool assembly 100 with its compact dimensions, may be easily installed by positioning output portion 107 over pipe access portion 122 and pushing pressure-fitted slip coupling device 106 onto the exterior surface of pipe access portion 122 having the open end with a relatively clean cut, flush edge. When slip coupling device 106 is sufficiently installed over pipe access portion 122, grip-ring 106C engages the exterior surface of pipe access portion 122 to oppose the withdrawal of pipe access portion 122 from release collet 106D and O-ring 106B provides a fluid-tight seal to prevent fluid leakage.

Upon installation of tool assembly 100 onto pipe access portion 122, air connector nozzle 102A of input portion 102 is attached to positively-pressurized air/gas source 120 via a compressor hose equipped with a quick-connect air chuck coupler. The pressurized air/gas source 120 is activated or turned on and the handle of flow control portion 104 is gradually turned from the closed position to an open position to regulate the ingress of pressurized air/gas flow at the desired amount, as supplied by pressurized air/gas source 120, regulated by flow control portion 104, and measured and indicated by pressure measurement gauge device 108. As shown in FIG. 1A, and more particularly in FIG. 1C, the pressurized air/gas flow travels through the interior channel of body member portion 101 and is directed to output portion 107, which introduces the pressurized air/gas flow into pipe access portion 122 and ultimately to the fluid flow pipe system or a section thereof to efficiently and effectively purge fluid from the system or section.

Once the fluid flow pipe system or a section has been sufficiently purged, the handle of flow control portion 104 is turned to the closed position to terminate the pressurized air/gas flow ingressing into body member portion 101 and pressurized air/gas source 120 is deactivated or turned off. Then, removal tool 106E is used to apply an urging force to flanged tubular release collet 106D. In so doing, the urging force is communicated to grip-ring 106C, which releases the engaging grip of the spring-biased angled teeth on the exterior surface of pipe access portion 122 and enables the facile detachment of tool assembly 100 from pipe access portion 122.

Figure 2:
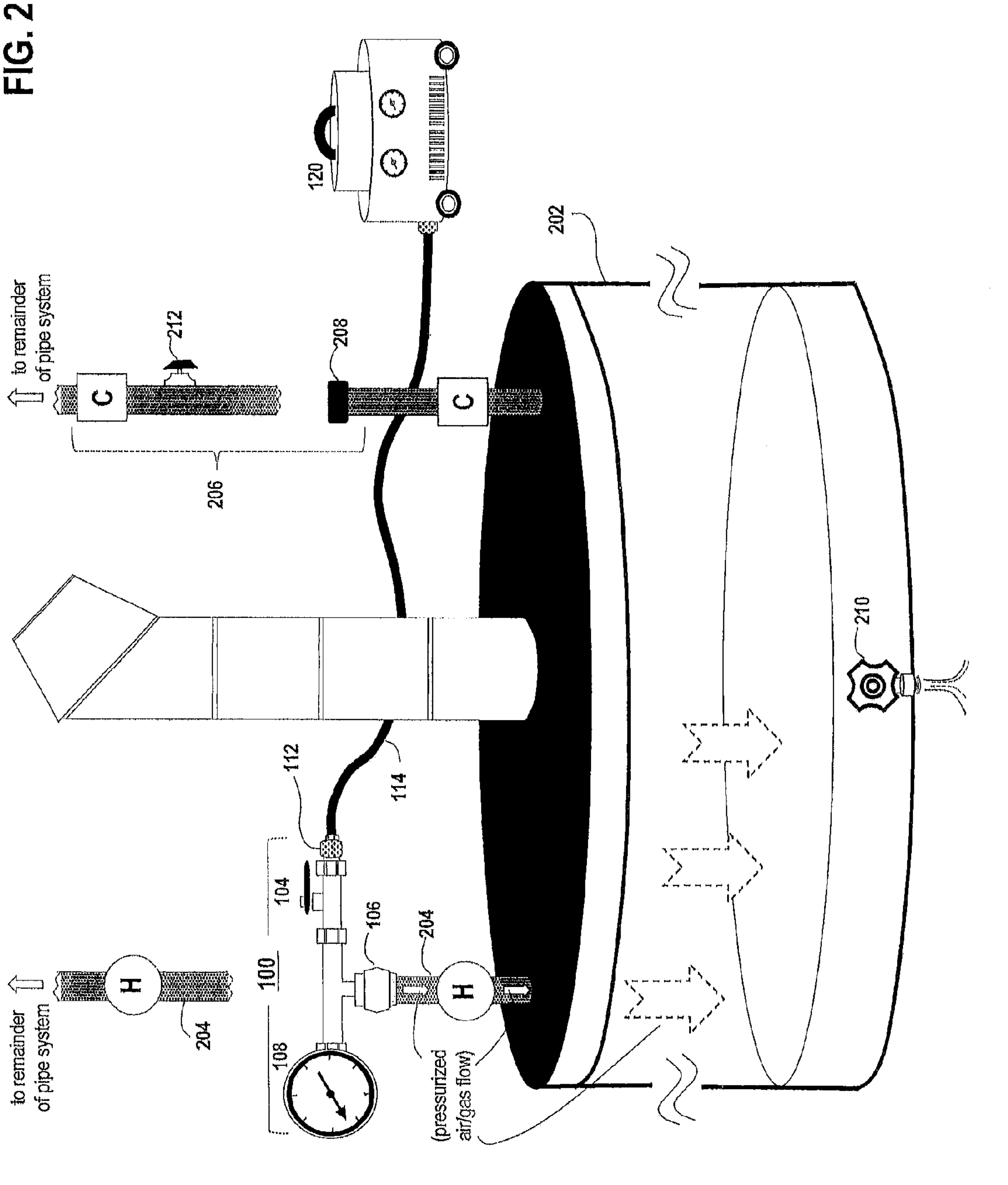
FIG. 2 depicts a first exemplary operation of a reusable tool assembly for purging fluid from a fluid-retaining vessel of a fluid flow pipe system, in accordance with various aspects and principles of the present disclosure.

With this said, FIG. 2 depicts a first exemplary operation of reusable tool assembly 100, in accordance with various aspects and principles of the present disclosure. This first exemplary operation relates to the purging of water from a defective hot water in need of replacement servicing. As alluded to above, and as will be appreciated by artisans of ordinary skill, water heaters also function as fluid-retaining vessels which, upon operational failure, need to be purged of most fluids prior to being physically removed and replaced, due to their sheer weight and size (e.g., a 50 gal. water heater weighs approx. 150 lbs. empty and approx. 550 lbs. full).

Typically, as illustrated in FIG. 2, the removal of a defective water heater 202 initially requires severing the incoming cold water supply feed pipe connection 206 and the outgoing hot water feed pipe connection 204 from water heater 202. In addition, drain cock valve 210 is also typically opened to allow the water retained by water heater 202 to drain therethrough.

However, in contrast to conventional measures, which rely solely on the internal volume of water and gravity to dictate the pressure flow egressing through drain cock valve 210, and which is invariably impeded by corroded sediment and deposits, tool assembly 100 efficiently and effectively forcibly purges the volume of water from water heater 202 via pressurized air/gas flow.

In particular, output portion 107 of tool assembly 100 may be attached either over the severed incoming cold water supply feed pipe connection 206 or severed outgoing hot water feed pipe connection 204 while the other feed pipe is capped with a stop fitting 208, so as to avoid compromising the pressurized air/gas flow entering and pressurizing the internal water of water heater 202. In the depicted embodiment of FIG. 2, tool assembly 100 is stably installed over severed outgoing hot water feed pipe connection 204 while the incoming cold water supply feed pipe connection 206 is severed below cold water supply valve 212 and capped with stop fitting 208. That is, pressure-fitted slip coupling device 106 is pushed onto the exterior surface of hot water feed pipe connection 204 having the open end with a relatively clean cut, flush edge, so that grip-ring 106C stably engages the exterior surface of hot water feed pipe connection 204 and O-ring 106B provides a fluid-tight seal to prevent air/gas flow leakage.

Then, pressurized air/gas source 120 is activated and the handle of flow control portion 104 is gradually turned from the closed position to an open position to regulate the ingress of pressurized air/gas flow at the desired amount, as supplied by pressurized air/gas source 120, regulated by flow control portion 104, and measured and indicated by pressure measurement gauge device 108. The regulated, pressurized air/gas flow travels through the interior channel of body member portion 101 and, as shown in FIG. 2 by the white arrows, is directed into outgoing hot water feed pipe connection 204 (i.e., pipe access portion) and into the interior of water heater 202.

Because cold water supply feed pipe connection 206 has been capped with a stop fitting 208, such capping ensures that the regulated, pressurized air/gas flow has no other viable means of escape other than to force the internal water of water heater 202 to flow through drain cock valve 210 at an increased rate.

Upon determining sufficient evacuation of water from water heater 202, such as by visual inspection of lack of water flow through drain cock valve 210 or auditory evidence of mostly air being expelled, for example, the handle of flow control portion 104 is turned to the closed position to terminate the pressurized air/gas flow and pressurized air/gas source 120 is deactivated. Then, removal tool 106E is used to apply an urging force to flanged tubular release collet 106D, which releases the engaging grip of the spring-biased angled teeth on the exterior surface of outgoing hot water feed pipe connection 204 and enables the detachment of tool assembly 100 from outgoing hot water feed pipe connection 204. At this point, water heater 202 may be easily removed to accommodate the installation of a replacement unit.

It should be appreciated that, during field tests, the inventor has confirmed that reusable tool assembly 100 has reduced the average time to sufficiently evacuate fluids and sediment debris from defective water heaters from 2¾ hours to less than 20 min.

Figure 3:
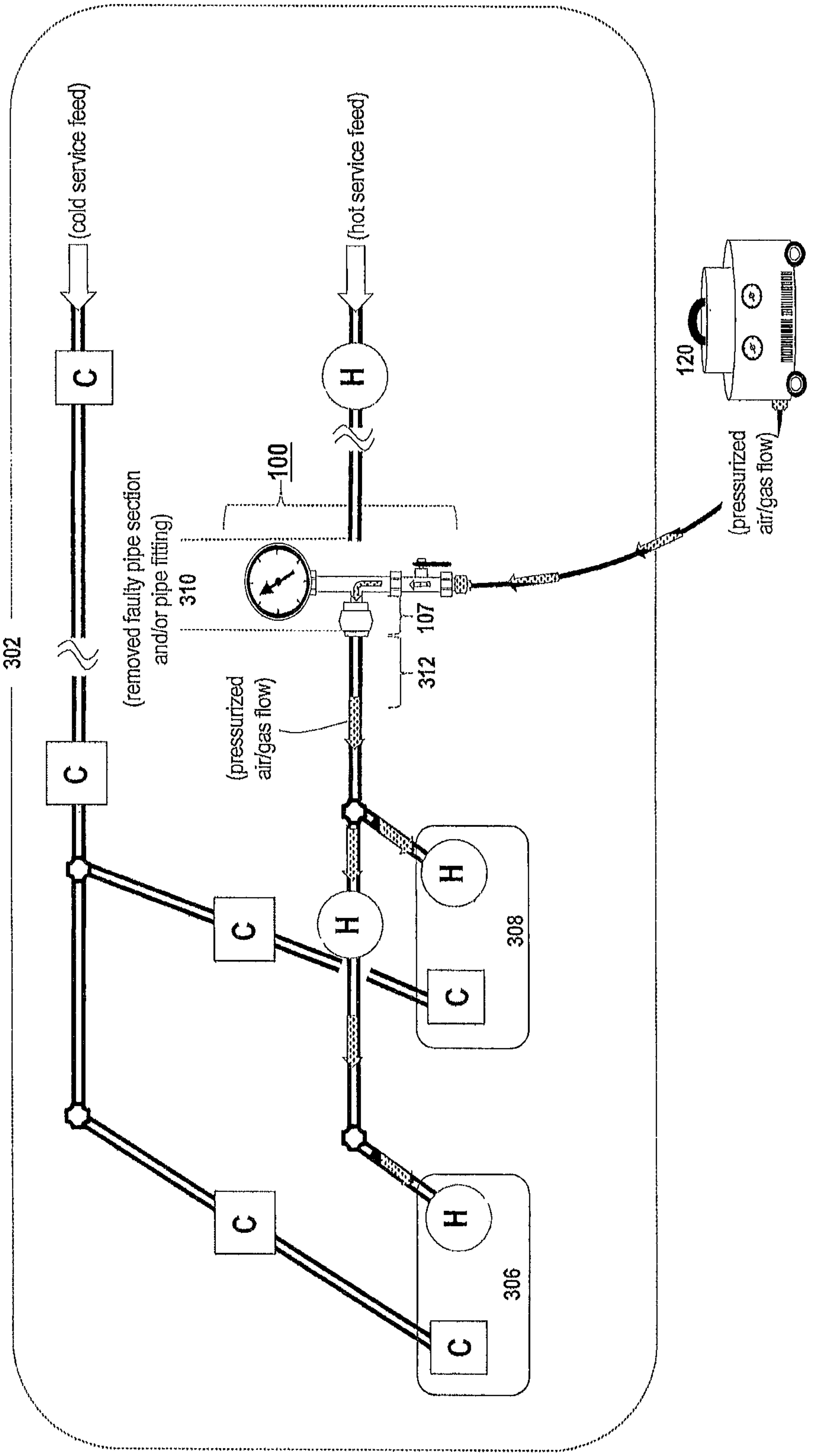
FIG. 3 depicts a second exemplary operation of a reusable tool assembly for purging fluid from a section of a fluid flow pipe system, in accordance with various aspects and principles of the present disclosure.

FIG. 3 depicts a second exemplary operation of reusable tool assembly 100, in accordance with various aspects and principles of the present disclosure. This second exemplary operation relates to the purging of water to repair a faulty pipe section or pipe fitting from a fluid flow pipe system. As noted above, fluid flow, or remnants thereof, such as droplets, pooling, drips, residual moisture/dampness, etc., generally delay if not retard the effective joining of pipes and pipe fittings, regardless of whether the joining comprises solder, glue, cement, or chemical welds.

In the depicted embodiment, fluid flow pipe system 302 comprises a pipe network with a cold service feed and a hot service feed having respective branches terminating at different downstream fixtures (e.g., sink, shower, etc.), including fixtures 306, 308 which may disposed in the same or different location. In addition, a faulty pipe section or pipe fitting (not shown) has been removed from its position located along the hot service feed line of fluid flow pipe system 302, indicated by reference numeral 310, to create a pipe access portion 312 that provides open access to a downstream section of fluid flow pipe system 302.

During servicing operations, downstream fixtures 306, 308 are opened to provide the pressurized air/gas flow generated by tool assembly 100 with an egress that facilitates the conveyance of residual fluids along with the pressurized air/gas flow. Then, as depicted, output portion 107 of tool assembly 100 is attached over a cut end of pipe access portion 312. That is, pressure-fitted slip coupling device 106 is pushed onto the exterior surface of the cut open end of pipe access portion 312 having a relatively clean cut, flush edge, so that grip-ring 106C stably engages the exterior surface of pipe access portion 312 and O-ring 106B provides a fluid-tight seal to prevent air/gas flow leakage.

Upon successful tool assembly 100 attachment, pressurized air/gas source 120 is activated and the handle of flow control portion 104 is gradually turned to the open position to regulate the ingress of pressurized air/gas flow at the desired amount, as supplied by pressurized air/gas source 120, regulated by flow control portion 104, and measured and indicated by pressure measurement gauge device 108. The regulated, pressurized air/gas flow travels through the interior channel of tool assembly 100 and, as shown by the shaded arrows in FIG. 3, is directed into pipe access portion 312 and then to the downstream section of fluid flow pipe system 302 to purge or blow out residual fluids from pipe access portion 312 and the downstream section of fluid flow pipe system 302 and ultimately out through downstream fixtures 306, 308.

After the lapsing of a predetermined time period or through visual and/or auditory evidence of mostly air being expelled of downstream fixtures 306, 308, which ensures that the residual fluids are sufficiently evacuated and that pipe access portion 312 and a proximate area of the downstream section of fluid flow pipe system 302 are adequately dry, the handle of flow control portion 104 is turned to the closed position to terminate the pressurized air/gas flow and pressurized air/gas source 120 is deactivated. Then, removal tool 106E is used to apply an urging force to flanged tubular release collet 106D, which releases the engaging grip of the spring-biased angled teeth on the exterior surface of pipe access portion 312 to enable the detachment of tool assembly 100 from pipe access portion 312.

At this stage, a replacement part that supplants the faulty pipe section or pipe fitting may be installed at position 310 by joining the replacement part to pipe access portion 312. By virtue of employing reusable tool assembly 100 to effectively purge and dry out pipe access portion 312 and the proximate area of the downstream section of fluid flow pipe system 302, the replacement part may be effectively joined, in an expedient manner, regardless of whether the joining comprises solder, glue, cement, or chemical welds.

Figure 4:
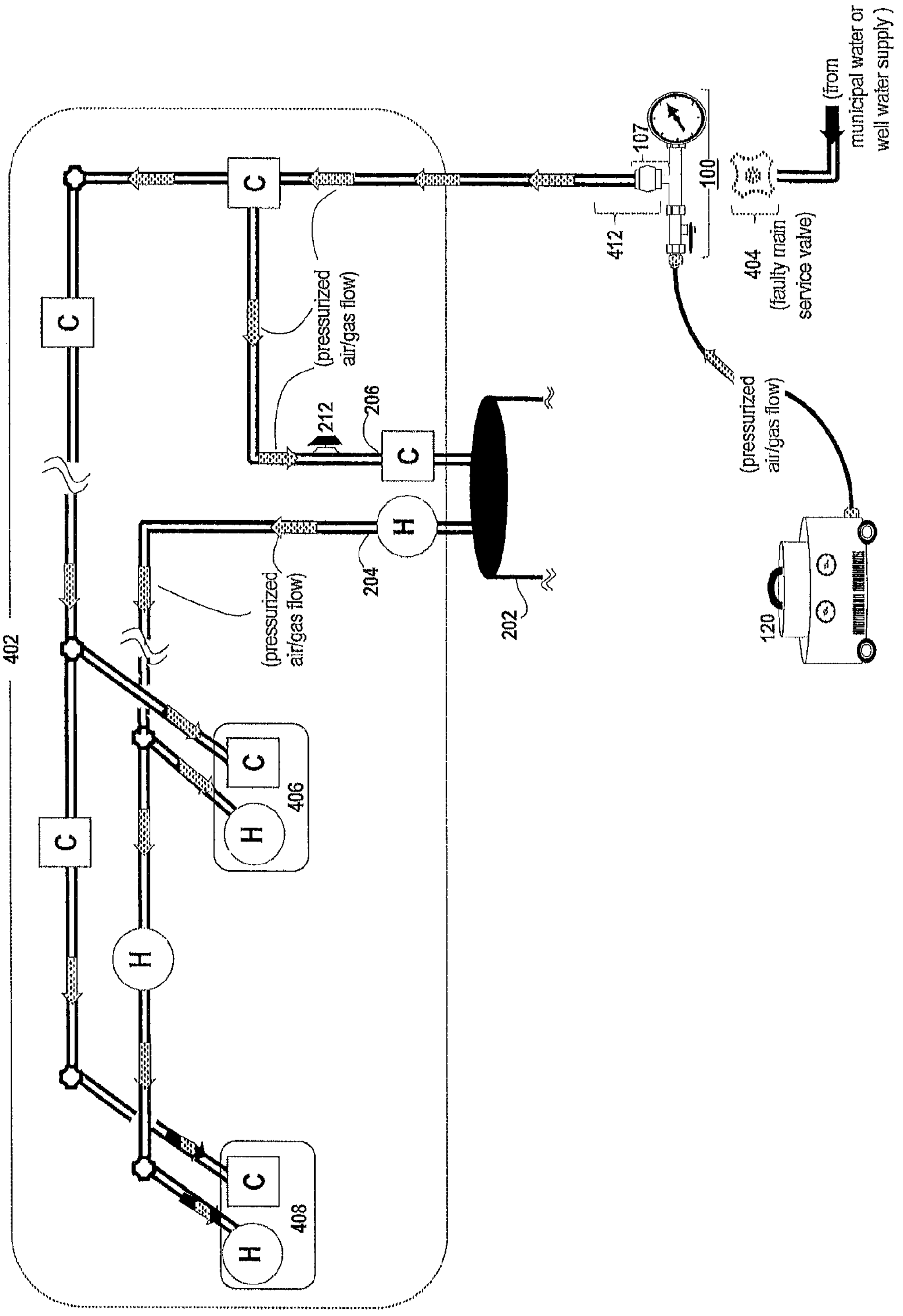
FIG. 4 depicts a third exemplary operation of a reusable tool assembly for purging fluid from an overall fluid flow pipe system, in accordance with various aspects and principles of the present disclosure.

FIG. 4 illustrates depicts a third exemplary operation of reusable tool assembly 100, in accordance with various aspects and principles of the present disclosure. This third exemplary operation relates to the purging of water to repair a faulty main service valve that affects the overall fluid flow pipe system.

The main service valve 404 controls the main water supply feed to the entire fluid flow pipe system 402 from either a municipal water source or well water system source. In the depicted embodiment, main service valve 404 has become defective and in need of replacement. Fluid flow pipe system 402 comprises a pipe network with a cold service feed and a hot service feed having respective branches terminating at different downstream fixtures (e.g., sink, shower, etc.), including fixtures 406, 408, which may disposed in the same or different location, and water heater 202.

Typically, main service valve 404 is installed along a lower level of fluid flow pipe system 402, which makes it susceptible to the gravitational draining of residual fluids (e.g., droplets, pools, drips, moisture/dampness, etc.). Such susceptibility to residual fluids complicates the ability to ensure a moisture-free, dried connection surface point from which to install a replacement main service valve.

As depicted, faulty main service valve 404 has been removed creating a pipe access portion 412 that provides open access to a downstream section of fluid flow pipe system 402. And, because the replacement servicing of faulty main service valve 404 affects the entire fluid flow pipe system 402, all downstream fixtures, such as fixtures 406, 408 are opened to enable the egress of residual moisture. In addition, the cold water supply valve 212 of water heater 202 is closed to prevent the pressurized air/gas flow provided by tool assembly 100 from forcing fluids of water heater 202 to flow back into fluid flow pipe system 402.

As shown, the output portion 107 of tool assembly 100 is then attached over a cut end of pipe access portion 412. That is, pressure-fitted slip coupling device 106 is pushed onto the exterior surface of the cut open end pipe access portion 412 having a relatively clean cut, flush edge, so that grip-ring 106C stably engages the exterior surface of pipe access portion 412 and O-ring 106B provides a fluid-tight seal to prevent air/gas flow leakage.

Then, pressurized air/gas source 120 is activated and the handle of flow control portion 104 is gradually turned to the open position to regulate the ingress of pressurized air/gas flow at the desired amount, as supplied by pressurized air/gas source 120, regulated by flow control portion 104, and measured and indicated by pressure measurement gauge device 108. The regulated, pressurized air/gas flow travels through the interior channel of tool assembly 100 and, as shown by the shaded arrows in FIG. 4, is directed into pipe access portion 412 and then throughout fluid flow pipe system 402 to purge or blow out residual fluids from pipe access portion 412 as well as fluid flow pipe system 402.

After the lapsing of a predetermined time period or through visual and/or auditory evidence of mostly air being expelled of downstream fixtures 406, 408, which ensures that the residual fluids are sufficiently evacuated and that pipe access portion 412 and a proximate area of the downstream section of fluid flow pipe system 402 are adequately dry, the handle of flow control portion 104 is turned to the closed position to terminate the pressurized air/gas flow and pressurized air/gas source 120 is deactivated. Then, removal tool 106E is used to apply an urging force to flanged tubular release collet 106D, which releases the engaging grip of the spring-biased angled teeth on the exterior surface of pipe access portion 412 to enable the detachment of tool assembly 100 from pipe access portion 412.

At this stage, a replacement main service valve is installed by joining the replacement valve to pipe access portion 412. Thus, by virtue of employing reusable tool assembly 100 to effectively purge and dry out pipe access portion 412 and fluid flow pipe system 402, the replacement valve may be effectively joined, in an expedient manner, regardless of whether the joining comprises solder, glue, cement, or chemical welds.

As should be apparent from the foregoing descriptions, reusable tool assembly 100 is configured to efficiently and effectively evacuate or purge fluid from a fluid flow pipe system or sections thereof, resulting in the significant reduction of repair/replacement service delays and customer inconvenience. Moreover, by virtue of its compact design, reusable tool assembly 100 is easy to install, operate, and remove from the fluid flow pipe system or sections thereof, even in the tightest of work spaces.

Furthermore, it should be appreciated that, by virtue of its versatility, reusable tool assembly 100 may be applied with equal efficacy to correct and/or diagnose a wide variety of fluid flow pipe system servicing issues that, while not expressly described, are certainly within the scope of this disclosure. That is, reusable tool assembly 100 may be used to efficiently and effectively evacuate or purge fluid from a fluid flow pipe system or sections in factories, car wash systems, swimming pool systems, irrigation systems, septic systems, etc.

Along similar lines, reusable tool assembly 100 may also be used as a diagnostic fluid leak test assembly for any fluid flow pipe system infrastructure. For example, after the installation of a new fluid flow pipe system and prior to the system being made operational by supplying the system with liquid fluid, all fixtures associated with the system are closed. Then, reusable tool assembly 100 may be coupled to the fluid flow pipe system to inject the fluid flow pipe system with air/gas flow at a designated pressure (e.g., 30-40 psi), as supplied by pressurized air/gas source 120, regulated by flow control portion 104, and measured and indicated by pressure measurement gauge device 108. The flow control portion 104 is then turned to the closed position and pressurized air/gas source 120 is deactivated. In this manner, the newly installed fluid flow pipe system is charged with, presumably, a static volume of pressurized air/gas, as monitored by measurement gauge device 108. Thus, leaks anywhere within the fluid flow pipe system may be identified by a drop in the designated pressure, as indicated by pressure measurement gauge device 108 over a relatively short period of time.

Having thus described the basic concepts, it will be rather apparent to those skilled in the art after reading this detailed disclosure that the foregoing detailed disclosure is intended to be presented by way of example only and is not limiting. Various alterations, improvements, modifications, and applications will occur and are intended to those skilled in the art, though not expressly stated herein. These alterations, improvements, modifications, and applications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, to the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

What is claimed is:

1. A reusable unitary tool for purging fluid from a fluid flow pipe system or portions thereof, comprising:

a body member having an interior channel of substantially uniform diameter to communicate a flow of positively-pressurized air/gas from an input port to a pressure measurement device and an output port;

the input port configured with an unthreaded connector for unthreadedly coupling to a complementary connecting end of a source of positively-pressurized air/gas source;

a flow control valve, integrated with the input port and the body member, configured to regulate an amount of pressurized air/gas flow communicated through the substantially uniform diameter interior channel;

the pressure measurement device, integrated with the body member, configured to indicate the amount of pressurized air/gas flow communicated through the substantially uniform diameter interior channel in accordance with the flow control valve; and the output port, integrated with the body member, introduces the regulated amount of pressurized air/gas flow communicated through the substantially uniform diameter interior channel into the fluid flow pipe system, the output port being integrated with a pressure-fitted slip coupling portion having an internal unthreaded arrangement that is configured to temporarily, releasably, and sealably slidably engage an exterior, unthreaded surface of a substantially cylindrical open pipe section of the fluid flow pipe system to allow the pressurized air/gas to flow into fluid flow pipe system or portions thereof and purge fluid therefrom.

2. The reusable unitary tool of claim 1, wherein the pressure-fitted slip coupling portion includes:

an internal O-ring configured to provide a fluid-tight seal of the tool assembly onto the open pipe section;

an internal hollow grip ring having a plurality of spring-biased angled teeth to engagingly grip the exterior, unthreaded surface of the open pipe end section to provide secure attachment of the tool assembly onto the open pipe section; and a flanged tubular collet that, upon urging, biases the hollow grip ring to release its grip on the open pipe end section and enable detachment of the tool from the open pipe end section.

3. The reusable unitary tool of claim 1, wherein the pressure-fitted slip coupling portion includes:

a top surface containing a tapped portion for integrating with the output port; and an open bottom surface that accepts and cooperates with the exterior, unthreaded surface of a substantially cylindrical open pipe section.

4. The reusable unitary tool of claim 3, wherein the tapped portion of the top surface of the pressure-fitted slip coupling portion has a first diameter that is smaller than a second diameter of the open bottom surface.

5. A method of purging fluid from a fluid flow pipe system or portions thereof, comprising:

cutting a pipe portion of the fluid flow pipe system to create an open, unthreaded pipe end section that provides access into the fluid flow pipe system or portions thereof;

applying the pressure-fitted slip coupling portion of the output port of the reusable unitary tool of claim 1 to the open pipe end section by pushing the pressure-fitted slip coupling portion over the exterior, unthreaded surface of the open pipe end portion to temporarily and sealably engage the exterior, unthreaded surface of the open pipe end portion;

supplying a positively-pressurized flow of air/gas;

regulating the amount of supplied positively-pressurized flow of air/gas;

monitoring, via the pressure measurement gauge device of the reusable unitary tool of claim 1, the amount of regulated pressurized air/gas flow introduced into the open pipe section and flowing into the fluid flow pipe system or portions thereof;

determining sufficient purging of fluids from the fluid flow pipe system or portions thereof based on audible inspection, visual inspection, and/or a predetermined time period; and terminating the supply of the positively-pressurized flow of air/gas.

6. The method of purging fluid of claim 5, wherein upon terminating the supply of the positively-pressurized flow of air/gas, removing the reusable unitary tool of claim 1 from the open pipe end section by applying an urging force to a flanged tubular collet of the reusable unitary tool to release the engaging grip of the pressure-fitted slip coupling portion on the exterior surface of the open pipe end section and facilitate detachment of reusable unitary tool of claim 1.

* * * * *